United States Patent [19]

Ikemoto

[11] Patent Number: 5,705,972
[45] Date of Patent: Jan. 6, 1998

[54] SUBSTRATE FOR AN INDUCTION SENSOR

[75] Inventor: Takeshi Ikemoto, Tokyo, Japan

[73] Assignee: NEC Corporation, Tokyo, Japan

[21] Appl. No.: 242,838

[22] Filed: May 16, 1994

[30] Foreign Application Priority Data

May 14, 1994 [JP] Japan ................... 5-135236

[51] Int. Cl.$^6$ .................................................. H01F 21/04
[52] U.S. Cl. ........................ 336/129; 336/129; 336/115
[58] Field of Search ............................. 336/75, 200, 206,
336/232, 30, 123, 129, 115, 122

[56] References Cited

U.S. PATENT DOCUMENTS

| | | | |
|---|---|---|---|
| 2,799,835 | 7/1957 | Tripp et al. | 336/123 |
| 2,915,722 | 5/1959 | Foster | 336/115 |
| 3,668,587 | 6/1972 | Foster | 336/123 |
| 3,673,584 | 6/1972 | Farrant | 336/129 |
| 3,953,816 | 4/1976 | Hennequin | 336/119 |
| 4,096,463 | 6/1978 | Gitzendanner et al. | 336/129 |

*Primary Examiner*—Michael L. Gellner
*Assistant Examiner*—Anh Mai
*Attorney, Agent, or Firm*—Sughrue, Mion, Zinn, Macpeak & Seas, PLLC

[57] ABSTRACT

In an electromagnetic induction type displacement sensor, two coil patterns are formed on a substrate included in a scale. The coil patterns alternate with each other in the sensing direction of the sensor and are deviated in spatial phase from each other by a quarter pitch. An idle pattern portion is included in one or both of the two coil patterns in order to provide them with the same impedance. Even when sinusoidal voltages, which are different in phase by 90 degrees, are respectively applied to the coil patterns, the resulting magnetic fields are identical and insure accurate displacement detection.

6 Claims, 2 Drawing Sheets

SUBSTRATE FOR AN INDUCTION SENSOR

BACKGROUND OF THE INVENTION

The present invention relates to a substrate for use in an electromagnetic induction type displacement sensor and, more particularly, to a coil pattern formed on such a substrate.

Implementing a displacement sensor of the type described with substrates is conventional. Specifically, this type of displacement sensor has a scale affixed to a sensor body, and a slider movable along with a desired object. A substrate is included in both the scale and the slider. While an AC current is fed to a coil pattern formed on one substrate, the sensor senses the displacement of the object on the basis of a voltage induced in a coil pattern formed on the other substrate.

Coil patterns on the substrates have been proposed in various configurations in order to enhance accurate detection or to miniaturize the sensor arrangement. For example, two coil patterns are provided on, the substrate of the scale and deviated in spatial phase from each other by a quarter pitch. Sinusoidal currents, which are different in phase from each other by 90 degrees, are respectively fed to the two coil patterns in order to promote accurate displacement detection.

Japanese Patent Laid-Open Publication No. 2-275314, for example, discloses a substrate having two coil patterns formed on the scale of the displacement sensor. The two coil patterns are deviated in spatial phase by a quarter pitch, and each is configured to have at least two double paths. Coil patterns are also formed on the substrate of the slider and superposed on the coil patterns of the scale. In this condition, sinusoidal currents different in phase from each other by 90 degrees are respectively fed to the two coil patterns of the scale. The resulting magnetic fields induce voltages in the coil patterns of the substrate of the slider. The displacement of an object is determined in terms of a deviation in phase between the voltages induced in the coil patterns of the slider and the voltages applied to the coil patterns of the scale so as to further promote accurate detection.

However, the conventional two coil pattern scheme has a problem that the lengths and, therefore, impedances of the coil patterns are different. In this condition, even when AC voltages of the same amplitude, but different in phase by 90 degrees, are respectively applied to the coil patterns, the resulting magnetic fields are not identical, preventing the sensor from operating with accuracy. This problem becomes more serious as the number of paths of the individual coil patterns increases.

SUMMARY OF THE INVENTION

It is, therefore, an object of the present invention to provide a substrate which allows a displacement sensor to operate with accuracy by generating identical magnetic fields even when sinusoidal voltages different in phase by 90 degrees are applied to two coil patterns.

A substrate for an electromagnetic induction type displacement sensor of the present invention comprises two coil patterns provided on a scale which is affixed to a body of the displacement sensor. The two coil patterns alternate with each other in the sensing direction of the displacement sensor and are deviated in spatial phase from each other by a quarter pitch. Sinusoidal currents different in phase from each other by 90 degrees are respectively applied to the two coil patterns. Means is provided for equalizing the impedances of the two coil patterns to each other.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, a brief reference will be made to a conventional substrate for an induction sensor, and, particularly to coil patterns thereof, shown in FIG. 1. As shown, two coil patterns A and B are formed on a substrate and deviated in spatial phase from each other by a quarter pitch. The substrate forms parts of a scale which forms a part of a displacement sensor. To enhance the accuracy of the sensor, sinusoidal currents different in phase from each other by 90 degrees are respectively fed to the coil patterns A and B.

Figure 2A:
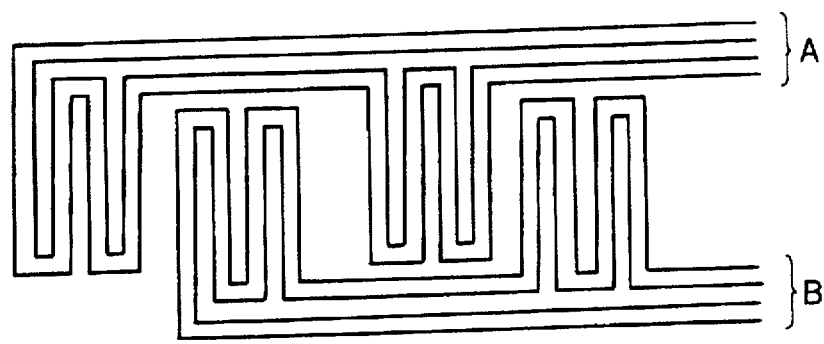
FIGS. 2A and 2B show another conventional coil pattern formed on the substrate of the scale.
Figure 2B:
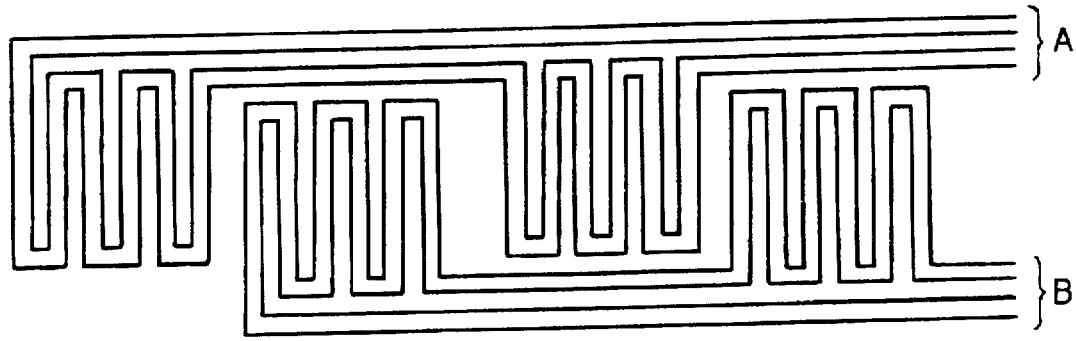

FIGS. 2A and 2B each shows other conventional coil patterns A and B which are of the kind taught in previously mentioned Japanese Patent Laid-Open Publication No. 2-275314. As shown, the coil patterns A and B are formed on the substrate of the scale and deviated in spatial phase by a quarter pitch. The coil patterns A and B are each configured to have at least two double paths (two double paths in FIG. 2A and three double paths in FIG. 2B). Coil patterns, not shown, are formed on the substrate of the slider and superposed on the coil patterns A and B. In this condition, sinusoidal currents, which are different in phase from each other by 90 degrees, are fed to the coil patterns A and B, respectively. The resulting magnetic fields induce voltages in the coil patterns of the substrate of the slider. The displacement of an object is determined in terms of a deviation in phase between the voltages induced in the coil patterns of the slider and the voltages applied to the coil patterns A and B so as to further promote accurate detection.

Figure 1:
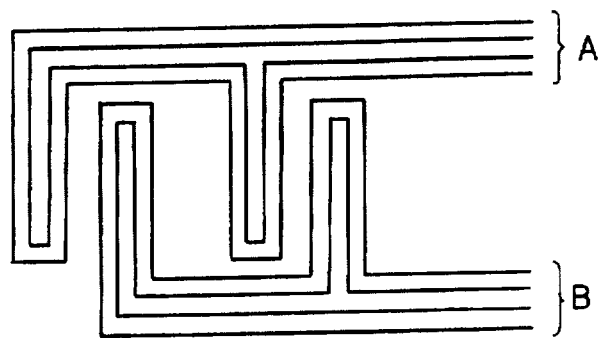
FIG. 1 shows a conventional coil patterns formed on a substrate which implements the scale of a displacement sensor.

However, the coil patterns A and B shown in FIGS. 1, 2A and 2B have a problem that the lengths and, therefore, impedances of the coil patterns A and B are different. In this condition, even when AC voltages of the same amplitude, but different in phase by 90 degrees, are respectively applied to the coil patterns A and B, the resulting magnetic fields are not identical, preventing the sensor from operating with accuracy.

Figure 3A:
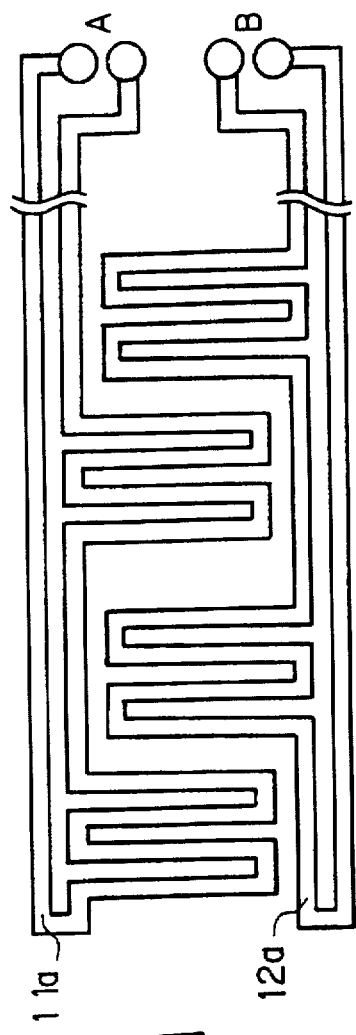
FIGS. 3A and 3B show coil patterns representative of an embodiment of the present invention.
Figure 3B:
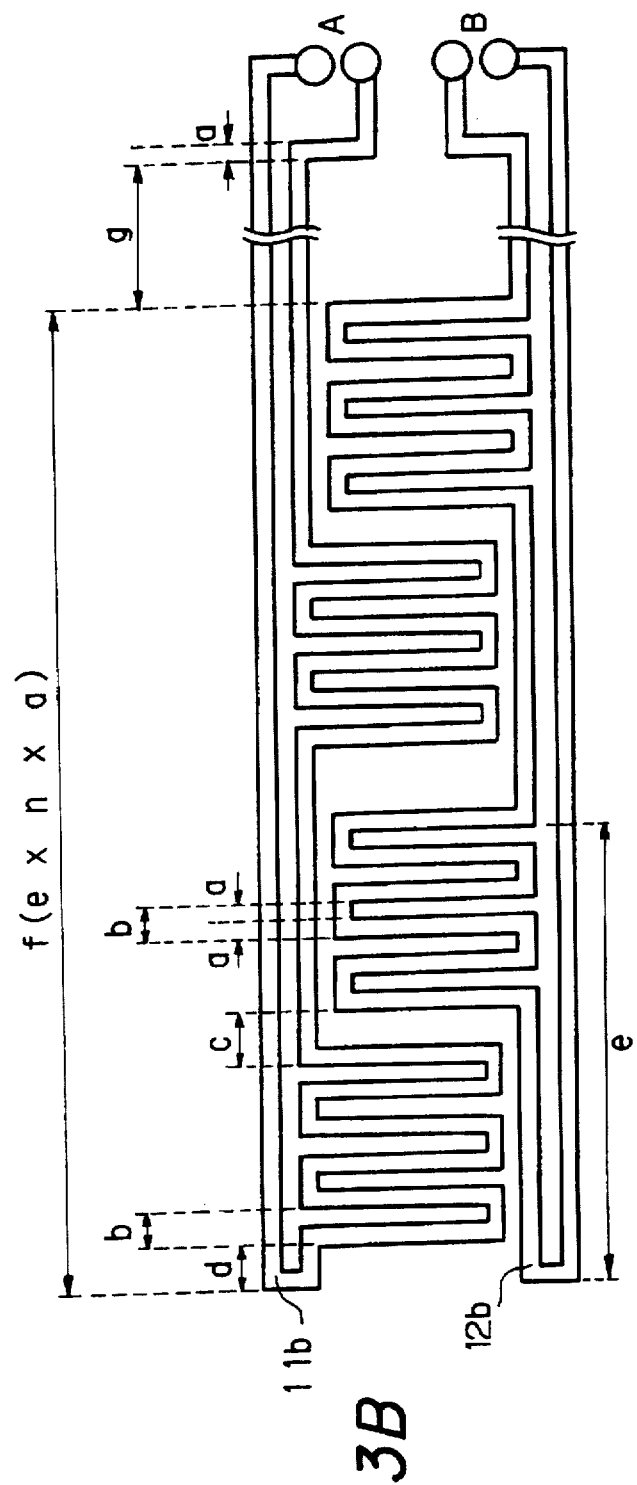

Referring to FIGS. 3A and 3B, a substrate embodying the present invention will be described. As shown, coil patterns A and B are formed on a substrate included in the scale of a displacement sensor, not shown. The coil patterns A and B each has two double paths in FIG. 3A or three double paths in FIG. 3B. In FIG. 3A, idle pattern portions 11a and 12a are respectively provided at the ends of the coil patterns A and B which are deviated in spatial phase from each other by a quarter pitch. Likewise, in FIG. 3B, idle pattern portions 11b and 12b are provided at the ends of the coil patterns A and B, respectively. The idle patterns 11a and 12a and the idle patterns 11b and 12b are used to provide the associated coil patterns A and B with the same length. As a result, the entire coil patterns A and B are provided with the same length and the same width and, therefore, the same impedance. It follows that when sinusoidal voltages different in phase by 90 degrees are respectively applied to the coil patterns A and B, the resulting magnetic fields are identical. This allows the sensor to sense a displacement accurately.

In the illustrative embodiment, both the coil patterns A and B, which are deviated in spatial phase by a quarter pitch, are provided with the idle patterns at the ends thereof. However, the crux of the present invention is to equalize the impedances of the coil patterns A and B to each other. Specifically, regarding the conventional arrangement shown in FIG. 1 or FIGS. 2A and 2B, only the shorter coil pattern B may be provided with an idle pattern portion in order to have the same impedance as the longer coil pattern A.

The coil patterns A and B shown in FIG. 3B have specific dimensions a through f, as follows:

a: 0.094 mm
b: 0.188 mm (=2×a)
c: 0.282 mm (=1.5×b)
d: 0.470 mm (=2.5×b)
e: 2.632 mm (=14×b)
f: 29.046 mm (=e×n×a)
g: 2.454 mm
n=11

The dimensions a through e each has a tolerance of ±0.001 mm while the dimensions f and g each has a tolerance of ±0.005 mm.

In summary, it will be seen that the present invention provides a substrate implementing an accurate displacement sensor. This is derived from a unique configuration wherein two coil patterns formed on the substrate of a scale are provided with respective idle patterns at the ends thereof and, therefore, have the same impedance as each other. It follows that magnetic fields generated by such two coil patterns are identical.

Various modifications will become possible for those skilled in the art after receiving the teachings of the present disclosure without departing from the scope thereof.

What is claimed is:

1. A substrate provided in scale of an electromagnetic induction type displacement sensor, wherein said substrate comprises:

a first and second coil pattern provided on said substrate, said first and second coil patterns having at least one double path, wherein said double paths of said first and second coil patterns extend toward the other of said first and second coil patterns in a direction perpendicular to a sensing direction of said displacement sensor, said double paths of said first and second coil patterns alternate with each other in the sensing direction of said displacement sensor, said first and second coil patterns are deviated in spatial phase from each other by a quarter pitch, and wherein sinusoidal currents different in phase from each other by 90 degrees are respectively applied to said first and second coil patterns; and means for equalizing the impedances of said first and second coil patterns.

2. A substrate as claimed in claim 1, wherein said means comprises an extension portion provided at an end of one of said first and second coil patterns for making the length of said one of said first and second coil patterns equal to the length of the other of said first and second coil patterns.

3. A substrate as claimed in claim 1, wherein said means comprises an extension portions respectively provided at ends of said first and second coil patterns for making the length of said first and second coil patterns equal to one another.

4. An electromagnetic induction type displacement sensor having a substrate provided in a scale, wherein said substrate comprises:

a first and second coil pattern provided on said substrate, said first and second coil patterns having at least one double path, wherein said double paths of said first and second coil patterns extend toward the other of said first and second coil patterns perpendicular to a sensing direction of said displacement sensor, said double paths of said first and second coil patterns alternate with each other in the sensing direction of said displacement sensor, and said first and second coil patterns are deviated in spatial phase from each other by a quarter pitch; and means for equalizing impedances of said first and second coil patterns.

5. An electromagnetic induction type displacement sensor as claimed in claim 4, wherein said means comprises an extension portion provided at an end of one of said first and second coil patterns for making the length of said one of coil patterns equal to the length of the other of said coil patterns.

6. An electromagnetic induction type displacement sensor as claimed in claim 1, wherein said means comprises an extension portions respectively provided at ends of said first and second coil patterns for making the length of said first and second coil patterns equal to one another.

* * * * *

UNITED STATES PATENT AND TRADEMARK OFFICE
CERTIFICATE OF CORRECTION

PATENT NO.   : 5,705,972
DATED        : January 6, 1998
INVENTOR(S)  : Takeshi IKEMOTO It is certified that error(s) appears in the above-identified patent and that said Letters Patent is hereby corrected as shown below:

Item No. 30, Foreign Application Priority Data, change "May 14, 1994" to --May 14, 1993--.

Signed and Sealed this

Nineteenth Day of May, 1998

*Attest:*

BRUCE LEHMAN

*Attesting Officer*   *Commissioner of Patents and Trademarks*